United States Patent [19]
Roswold

[11] Patent Number: 5,111,011
[45] Date of Patent: May 5, 1992

[54] MIRROR CONTROL SLIDE SWITCH FOR AUTOMOTIVE VEHICLES

[75] Inventor: Wesley D. Roswold, Elgin, Ill.

[73] Assignee: Indak Manufacturing Corp., Northbrook, Ill.

[21] Appl. No.: 692,708

[22] Filed: Apr. 29, 1991

Related U.S. Application Data

[62] Division of Ser. No. 557,976, Jul. 26, 1990, Pat. No. 5,041,703.

[51] Int. Cl.⁵ .......................................... H01H 15/24
[52] U.S. Cl. ................................. 200/550; 200/531; 200/252; 200/257; 200/260; 200/291; 200/323; 200/16 A; 200/16 C
[58] Field of Search ............... 200/547, 548, 550, 551, 200/530, 531, 252, 257, 260, 16 R, 16 A, 16 C, 291, 323

[56] References Cited

U.S. PATENT DOCUMENTS

| | | | |
|---|---|---|---|
| 2,725,432 | 11/1955 | Brown | 200/550 X |
| 3,330,930 | 7/1967 | Hill et al. | 200/252 |
| 3,500,002 | 3/1970 | Bedocs . | |
| 3,740,500 | 6/1973 | Garrett et al. | 200/16 C |
| 3,912,887 | 10/1975 | Gratz et al. | 200/550 X |
| 4,412,109 | 10/1983 | Schaad et al. . | |
| 4,428,649 | 1/1984 | Main et al. | 200/550 X |
| 4,491,703 | 1/1985 | Jaklic | 200/291 X |
| 4,517,422 | 5/1985 | Black et al. . | |
| 4,698,464 | 10/1987 | Tanaka et al. . | |
| 4,886,946 | 12/1989 | Franks, Jr. | 200/329 |
| 4,926,014 | 5/1990 | Cummings . | |
| 5,041,703 | 8/1991 | Roswold | 200/5 R |

FOREIGN PATENT DOCUMENTS 1196274 7/1965 Fed. Rep. of Germany ...... 200/548

Primary Examiner—Ernest G. Cusick
Attorney, Agent, or Firm—Palmatier & Zummer

[57] ABSTRACT

The disclosed slide action selector switch, which is adapted to switch the connections of four push button switches between left and right mirror motors, comprises an insulating plate with an elongated guide flange projecting therefrom and having a T-shaped cross section. First and second sets of electrical contacts are mounted along the plate on opposite sides of the flange for sliding engagement by first and second contactors on an insulating carriage having a T-shaped channel slidably receiving and interlocking with the flange. Springs are provided on the carriage for biasing the contactors against the contacts while biasing the carriage away from the plate. A detent ball is disposed in a seat formed in a leaf spring on the carriage and is biased by the leaf spring against the flange for reception in successive detent recesses therein.

4 Claims, 8 Drawing Sheets

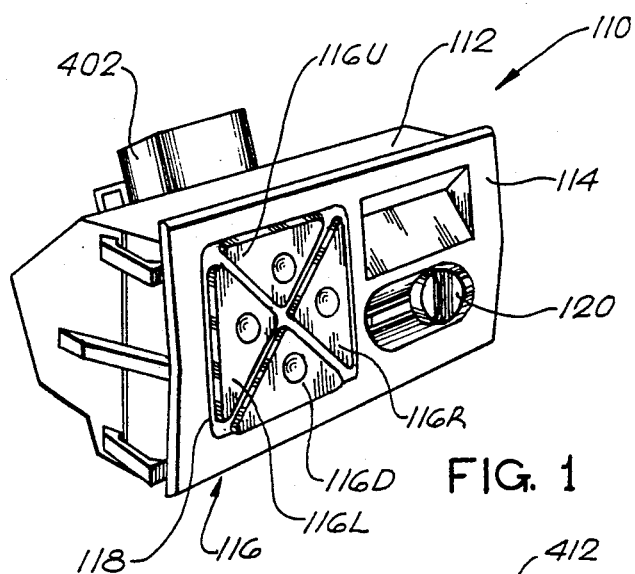
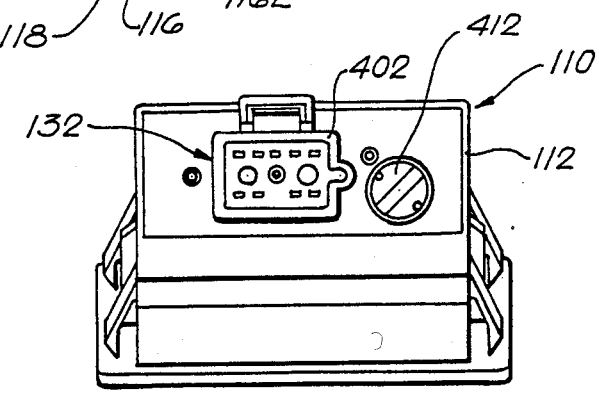
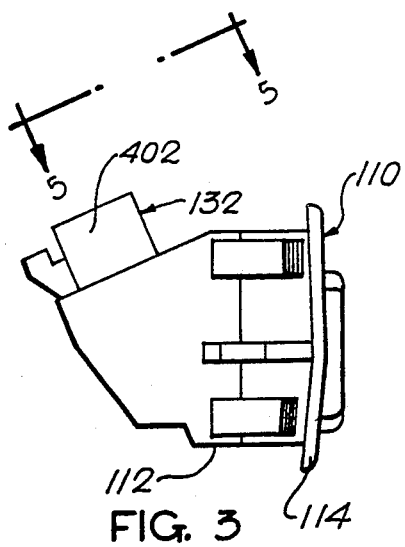
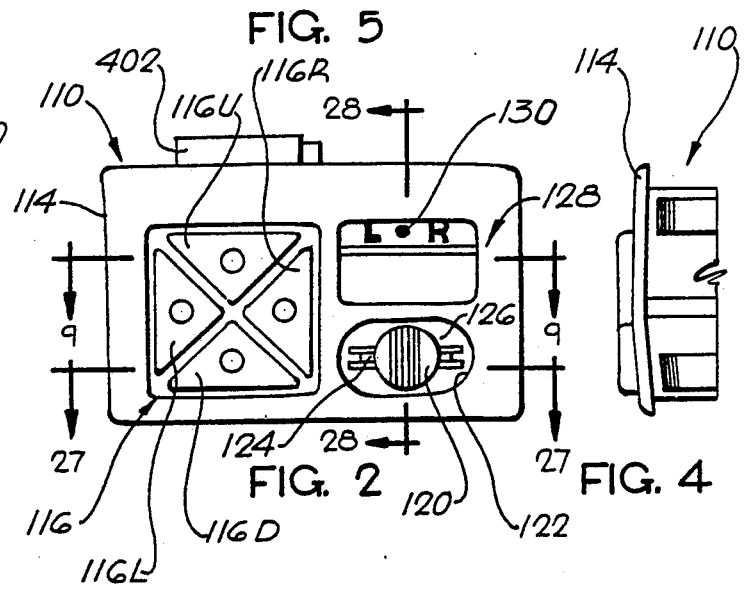

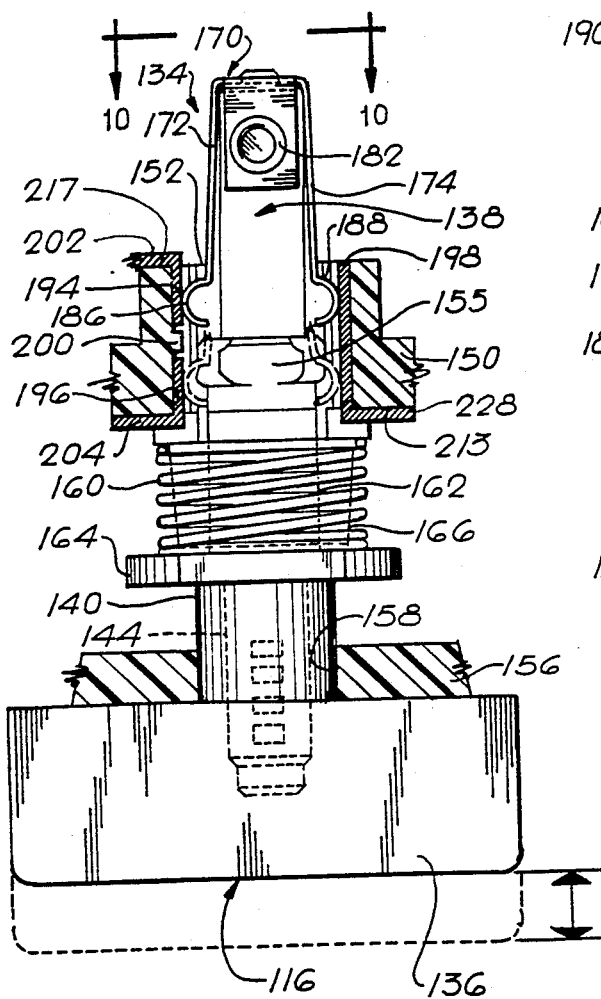
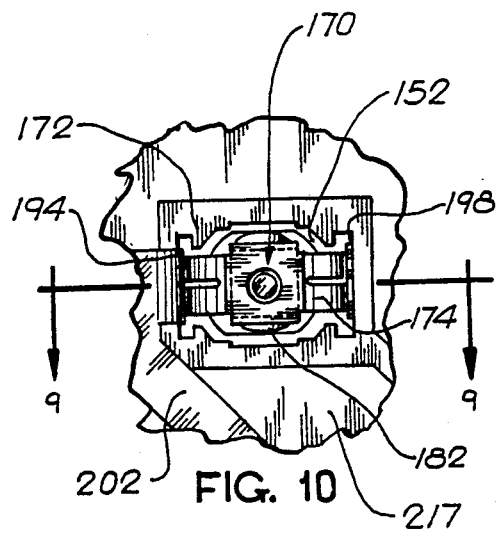

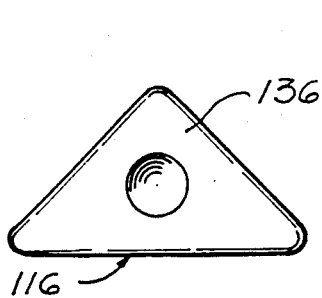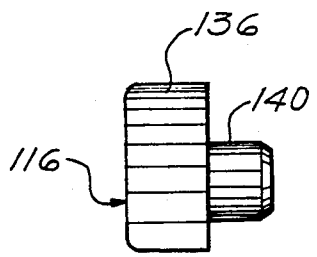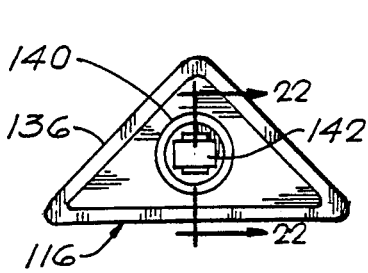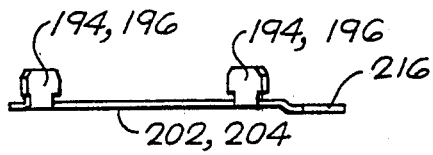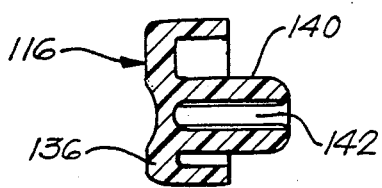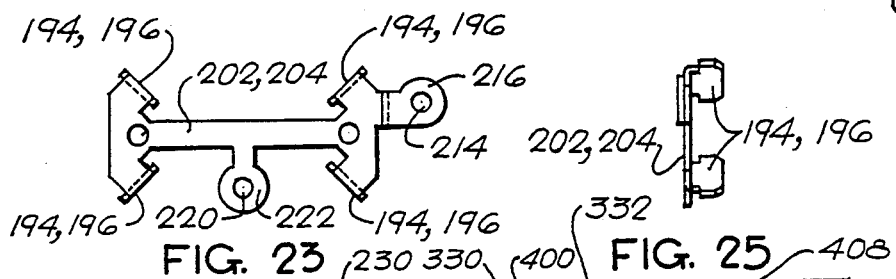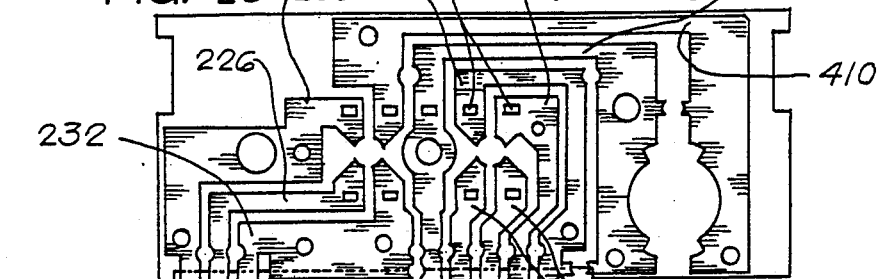

| TRUTH TABLE | | | | |
|---|---|---|---|---|
| MULTIPLE SWITCHES ACTUATED | | | | |
| ACTUATE | | | | DIRECTION MIRROR MOVES |
| DOWN | UP | RIGHT | LEFT | |
| – | – | – | – | NO MOTORS RUN. |
| X | X | X | X | NO MOTORS RUN. |
| X | X | X |   | RUNS RIGHT. |
| X | X |   | X | RUNS LEFT. |
| X |   | X | X | RUNS DOWN. |
|   | X | X | X | RUNS UP. |
| X | X |   |   | NO MOTORS RUN. |
| X |   | X |   | RUNS DOWN & RIGHT. |
| X |   |   | X | RUNS DOWN & LEFT. |
|   | X | X |   | RUNS UP & RIGHT. |
|   | X |   | X | RUNS UP & LEFT. |
|   |   | X | X | NO MOTORS RUN. |

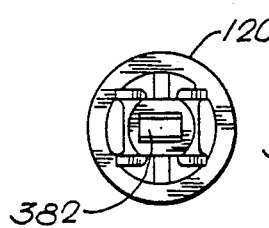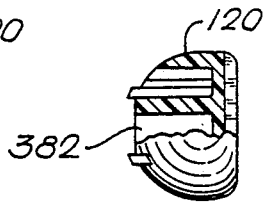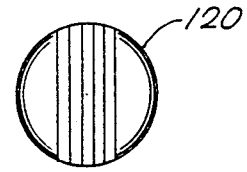
FIG. 32    FIG. 33    FIG. 31
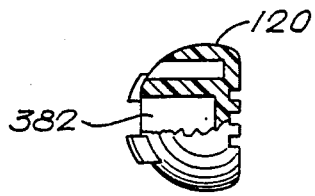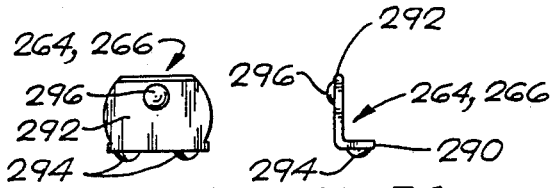
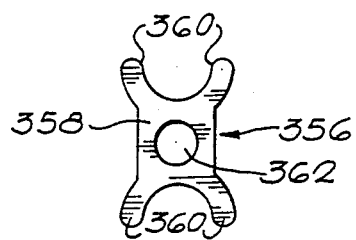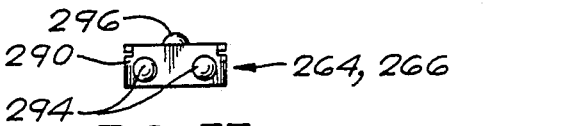
FIG. 38    FIG. 37
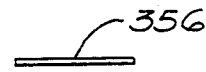
FIG. 39
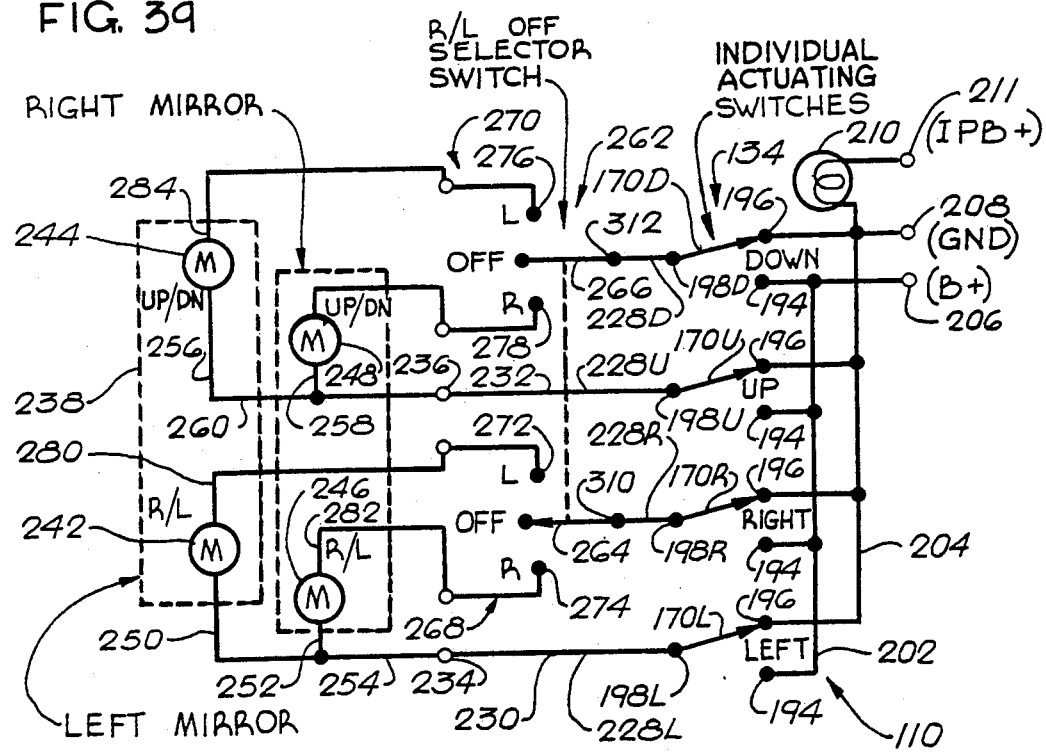
FIG. 29

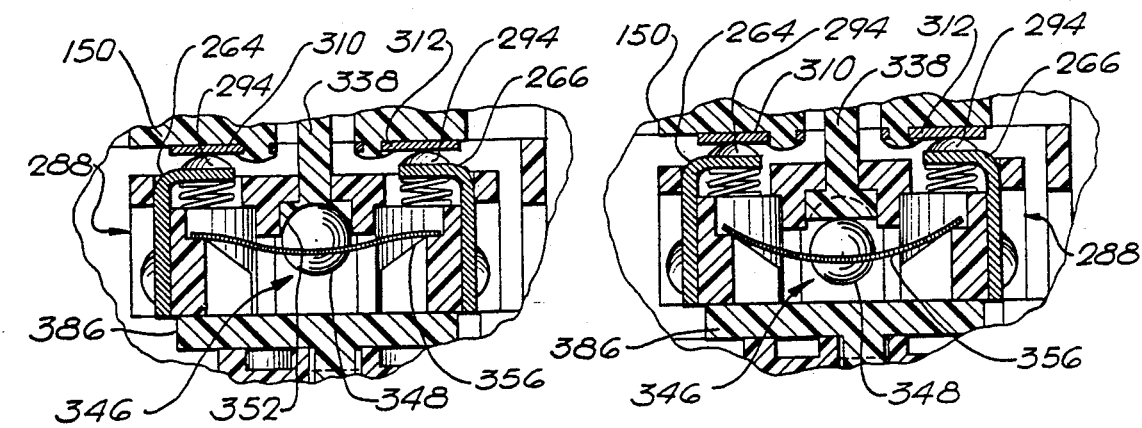
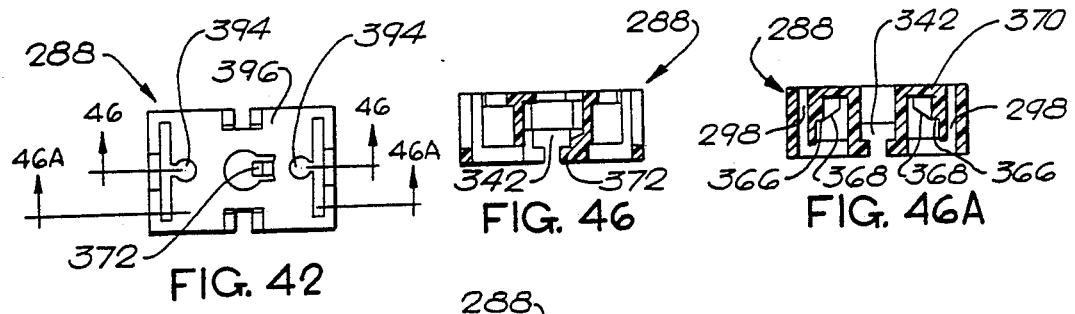
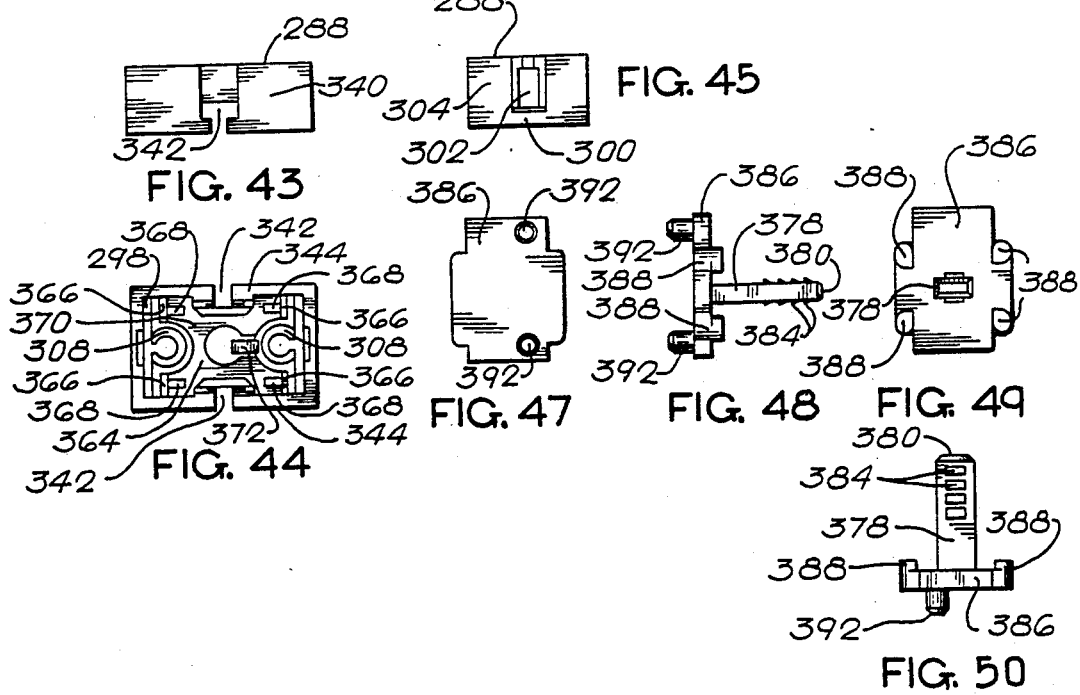

MIRROR CONTROL SLIDE SWITCH FOR AUTOMOTIVE VEHICLES

This application is a division of application Ser. No. 07/557,976, filed Jul. 26, 1990, U.S. Pat. No. 5,041,703.

FIELD OF THE INVENTION

This invention relates to electrical switches for controlling motorized rearview mirrors on automobiles and other automotive vehicles.

BACKGROUND OF THE INVENTION

Virtually every automotive vehicle is provided with an outside rearview mirror on the driver's side of the vehicle, which is the left side as to most countries. Moreover, most automobiles and other automotive vehicles have outside rearview mirrors on the opposite side, which is the right side as to most countries. Some outside mirrors are motorized in that the mirrors are pivotally mounted in housings containing UP-DOWN and RIGHT-LEFT electric motors for adjusting the mirrors by operation of electrical control switches within easy reach of the driver.

SUMMARY OF THE INVENTION

One object of the present invention is to provide a new and improved mirror control switch device having a cluster of four push button switches comprising UP, DOWN, LEFT, and RIGHT push buttons for controlling the energization of UP-DOWN and LEFT-RIGHT electrical motors in opposite directions to adjust an outside mirror to any desired angle within the control ranges of the mirror.

Another object of the invention is to provide a new and improved mirror control switch device of the foregoing character which also comprises a selector switch for connecting the push button switches of the switch device to either a left or a right hand outside mirror.

A further object is to provide a new and improved mirror control switch device of the foregoing character in which the selector switch also has an OFF position.

The mirror control switch device may include two sets of output terminals adapted to be connected to UP-DOWN and LEFT-RIGHT motors of left and right outside rearview mirrors, and a selector switch for switching certain of the motor supply terminals between certain of the output terminals of the two sets of output terminals for selecting between the motors of the left and right outside rearview mirrors.

The selector switch may comprise first and second contactors, each of which has an OFF position and is movable in opposite directions to left and right switching positions, the selector switch including first and second sets of fixed contacts engageable by the first and second contactors.

Each of the sets of fixed contacts may comprise a central contact and left and right contacts, the switch device comprising means connecting the left and right contacts to certain of said output terminals.

The mirror control switch device may comprise a plurality of output terminals adapted to be connected to UP-DOWN and LEFT-RIGHT motors of left and right outside rearview mirrors, and a double pole double throw selector switch connected between the motor supply terminals and the output terminals for selectively activating the output terminals for the motors of either the left or the right side rearview mirror.

The output terminals may include two common terminals adapted to be connected to the motors of both the left and right mirrors, the common terminals being connected to two of the motor supply terminals, the output terminals including two pairs of switchable terminals, the selector switch being connected to the switchable terminals and also to the other two motor supply terminals not connected to the common terminals.

The present invention may provide an electrical selector switch, comprising a casing, an electrically insulating plate in the casing, the plate having one side formed with an elongated guide rib or flange projecting therefrom and extending in a longitudinal dimension along the side of the plate, the side being generally flat, the flange being generally T-shaped in cross section and being substantially perpendicular to such side of the plate, first and second sets of electrically conductive fixed contacts mounted along the generally flat side of the plate on opposite sides of the flange, an electrically insulating carriage having a longitudinal channel therein slidably receiving and interlocking with the flange and having a cross section corresponding with the generally T-shaped cross section of the flange, first and second electrically conductive contactors mounted on the carriage and slidably engageable with the first and second sets of fixed contacts, and first and second spring means for biasing the first and second contactors toward and against the first and second sets of fixed contacts while biasing the carriage away from the plate, the carriage being slidable along the flange while the contactors are selectively engageable with the first and second sets of fixed contacts.

The electrical selector switch may include a detent ball disposed between the carriage and the flange, the carriage having a seat therein for receiving and locating the ball, and additional spring means disposed between the carriage and the ball for biasing the ball against the flange while biasing the carriage away from the flange, such flange being formed with a plurality of detent recesses for receiving the ball in a plurality of detented positions.

The additional spring means may comprise a leaf spring received in the carriage and having a portion forming the seat for receiving and engaging the ball.

Each of the sets of fixed contacts may comprise a series of three successively adjacent fixed contacts, each of the contactors being movable into bridging relation between the successively adjacent fixed contacts.

DESCRIPTION OF THE DRAWINGS

Further objects, advantages and features of the present invention will appear from the following description, taken with the accompanying drawings, in which:

FIG. 1 is a general front perspective view of a mirror control switch to be described as an illustrative embodiment of the present invention.

FIG. 2 is a front elevational view of the mirror control switch of FIG. 1.

FIG. 3 is a left side elevational view of the switch.

FIG. 4 is a partial left side elevational view of the switch with a portion of the switch broken away.

FIG. 5 is generally a top view of the switch, but is taken at an inclined angle as indicated by the line 5—5 in FIG. 3.

FIG. 9 is a greatly enlarged fragmentary horizontal section taken through one of the four push button switch assemblies employed in the switch of FIGS. 1-5, taken generally along the line 9—9 in FIG. 2, the line 9—9 also being shown in FIG. 10.

FIG. 10 is a greatly enlarged fragmentary rear elevation of the push button switch assembly shown in FIG. 9, the view being taken generally as indicated by the line 10—10 in FIG. 9.

FIG. 11 is a plan view of one of the four push button switch contactors employed in the switch of FIGS. 1-5.

FIG. 12 is a rear elevation of the switch contactor of FIG. 11.

FIG. 13 is a front elevation of the switch contactor of FIG. 11.

FIG. 14 is a side elevation of the switch contactor of FIG. 11.

FIG. 15 is a plan view of one of the four push button shafts employed in the switch of FIGS. 1-5.

FIG. 16 is a side elevation of the push button shaft of FIG. 15.

FIG. 17 is a rear elevation of the push button shaft of FIG. 15.

FIG. 18 is a front elevation of the push button shaft of FIG. 15.

FIG. 19 is a front elevation of one of the four push button knobs employed in the switch of FIGS. 1-5.

FIG. 20 is a side elevation of the knob of FIG. 19.

FIG. 21 is a rear elevation of the knob of FIG. 19.

FIG. 22 is a sectional view taken through the knob, generally along the line 22—22 in FIG. 21.

FIG. 23 is a front elevational view of a fixed electrical contact component of the switch shown in FIGS. 1-5.

FIG. 24 is a plan view of the contact component of FIG. 23.

FIG. 25 is a side elevation of the contact component of FIG. 23.

FIG. 26 is an enlarged front assembly view showing the shaft guiding body or plate of FIG. 6, with contact members and electrical conductors mounted thereon, the view also showing conductor elements adapted to be connected to the receptacle terminals whereby connections are established between the switch device and an electrical cable.

FIG. 29 is a schematic electrical circuit diagram of the mirror control switch.

FIG. 31 is a front elevational view of an operating knob for the left-right selector switch device of FIGS. 27 and 28.

FIG. 32 is a rear elevation of the knob of FIG. 31.

FIG. 33 is a side view of the knob, partly in section along a generally central vertical plane.

FIG. 34 is a plan view of the knob, partly in section along a generally central horizontal plane.

FIG. 35 is a plan view of one of the two identical contactors for the selector switch device.

FIG. 36 is a side view of the contactor of FIG. 35.

FIG. 37 is a rear elevational view of the contactor of FIG. 35.

FIG. 38 is an elevational view of a leaf spring employed in the selector switch device.

FIG. 39 is an edge view of the leaf spring of FIG. 38.

FIG. 40 is a fragmentary enlarged vertical section taken through the selector switch device of FIG. 27 and showing the detent ball in one of its detented positions, the view being similar to FIG. 28, but being taken along a slightly different section plane to show the leaf spring in section.

FIG. 41 is a fragmentary sectional view similar to FIG. 40 but showing the detent ball in a changed position in which the ball is not detented.

FIG. 42 is a front elevation of the carriage for the selector switch device.

FIG. 43 is a side elevation of the carriage of FIG. 42.

FIG. 44 is a rear elevation of the carriage of FIG. 42.

FIG. 45 is an end or plan view of the carriage of FIG. 42.

FIGS. 46 and 46A are sectional views taken through the carriage, generally along the lines 46—46 and 46A—46A in FIG. 42.

FIG. 47 is a rear elevation of a connecting component or slider, adapted to be connected to the operating knob for the selector switch device, and also adapted to mate with the carriage so as to establish an operating connection thereto.

FIG. 48 is a side elevation of the connecting component of FIG. 47.

FIG. 49 is a rear elevation of the connecting component.

FIG. 50 is a plan view of the connecting component.

DETAILED DESCRIPTION OF AN ILLUSTRATIVE EMBODIMENT

Figure 6:
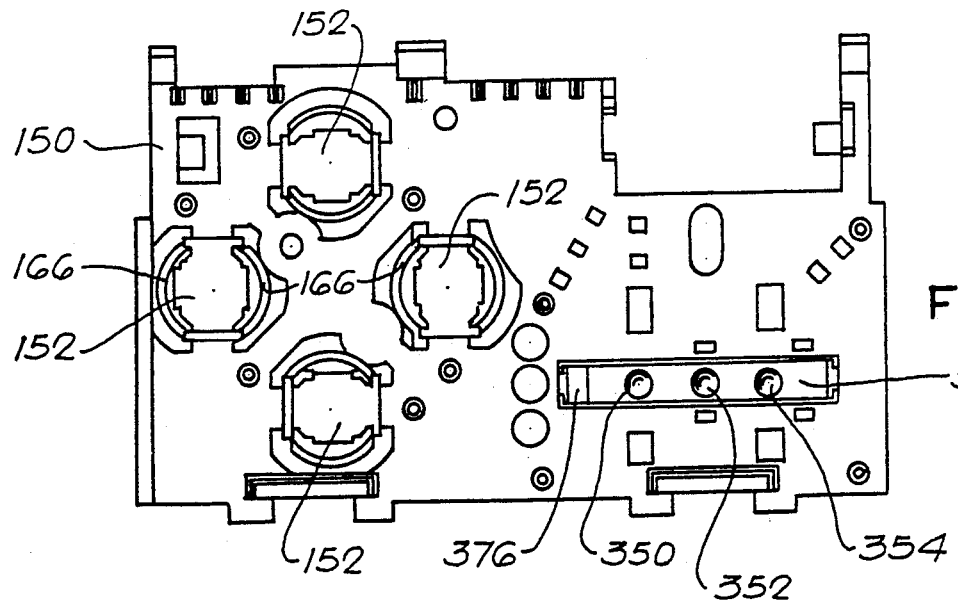
FIG. 6 is an enlarged front view of a shaft guiding body or plate, constituting one of the components of the switch of FIGS. 1-5.

As indicated above, the drawings show a preferred illustrative embodiment of the present invention which at present is believed to be the best mode of practicing the invention. Thus, FIGS. 1-5 illustrate the external appearance of a mirror control switch device 110, adapted to be mounted in a suitable opening formed in a front control panel of an automobile, truck or other automotive vehicle. The switch device 110 is adapted to control the energization of UP-DOWN and LEFT-RIGHT motors of either the left hand or the right hand outside rearview mirror on the vehicle. It will be understood that a simplified model of the switch device 110 could be produced for controlling only the left hand outside rearview mirror, for a vehicle which is not equipped with a right hand mirror. The switch device 110 and the motors for the left and right mirrors are interconnected to provide a remote control system, whereby the mirrors may be adjusted to any desired angle by manipulating the switch device 110, which may be located in a convenient position within easy reach of the driver of the motor vehicle.

The mirror control switch device 110 comprises a casing 112 adapted to be mounted in an opening in the control panel of the vehicle. The front of the casing 112 is provided with a bezel 114 which serves as the front wall of the casing 112 and is the only portion of the casing which is visible to the driver.

The switch device 110 has a cluster of four push buttons 116 which may be depressed by the driver and are adapted to operate a corresponding cluster of four push button switches within the casing 112. The push button switches will be described presently. In FIGS. 1 and 2, the push buttons 116 are identified individually as an UP push button 116U, a DOWN push button 116D, a LEFT push button 116L and a RIGHT push button 116R.

The four clustered push buttons 116 are generally triangular in shape so that the cluster is generally rectangular or square in shape. As shown particularly in FIGS. 1 and 2, the four clustered push buttons 116 are received in a generally rectangular or square recess 118 formed in the bezel 114 at the front end of the casing 112.

The clustering of the four push buttons 116 makes it convenient for the driver of the vehicle to operate the push buttons individually or two at a time, in any of the four desirable combinations. For example, the driver may find it convenient to operate the push buttons 116U and 116L simultaneously. The other three advantageous combinations comprise the push buttons 116U and 116R; the push buttons 116D and 116L; and the push buttons 116D and 116R.

The clustering of the push buttons 116 also gives rise to the possibility that the driver may inadvertently operate undesirable combinations of the push buttons 116. For example, the driver may inadvertently operate all four push buttons 116 simultaneously. Moreover, the driver may inadvertently operate several different combinations of three of the push buttons 116 simultaneously. Other undesirable combinations include the push buttons 116U and 116D simultaneously; and the push buttons 116L and 116R simultaneously.

However, the present invention is constructed and arranged so that the simultaneous depression of undesirable combinations of push buttons will not produce any undesirable results. In particular, the present invention completely obviates any possibility of short circuiting the battery power circuit by operating any combination of the push buttons 116.

The mirror control switch device 110 preferably also comprises a selector switch whereby the four push buttons 116 may be employed for controlling either a left hand or a right hand outside rearview mirror. The selector switch is mounted within the casing 112 and will be described in detail presently. As shown in FIGS. 1 and 2, the selector switch comprises an operating knob 120 which is located in front of the bezel 114, in an oval recess 122, formed in the front side of the bezel 114. In FIG. 2, the operating knob 120 is shown in its central or OFF position, in which the four push button switches are disconnected from the mirror adjusting motors of both mirrors. The operating knob 120 is slidable in opposite directions to LEFT and RIGHT positions in which the four push button switches are connected to the adjusting motors of the left and right outside rearview mirrors. The operating knob 120 is guided for such movement by a slot 124, formed in the bezel 114 and extending along the longitudinal dimension of a wall 126 which constitutes the rear wall of the oval recess 122.

The mirror control switch device 110 also comprises an illuminated display 128 for marking the three possible positions of the operating knob 120 for the selector switch. The display 128 includes legends which read L and R, above and opposite the left and right hand positions of the operating knob 120. In such positions, the four push button switches are connected to the adjusting motors of the left and right hand outside rearview mirrors. The central or OFF position of the operating knob 120 is indicated by a dot 130, located centrally between the legends which read L and R.

As shown in FIGS. 3 and 5, the mirror control switch device 110 is provided with an electrical receptacle 132 adapted to receive an electrical cable connector whereby the switch device 110 is connected electrically to the adjusting motors of the left and right outside rearview mirrors of the vehicle.

As previously indicated, the mirror control switch device 110 comprises four push button switches which are operable by the four push buttons 116. FIGS. 9 and 10 illustrate one of the push button switches 134, all four of which are essentially the same in construction. Each push button switch 134 is operable by one of the push buttons 116. Each push button 116 may be regarded as a component of the corresponding switch 134. It will be understood that the construction of each push button 116 may be varied, so that the specific construction illustrated in FIGS. 9 and 10 is disclosed as a preferred construction. As shown, the push button 116 comprises an enlarged knob or finger pad 136, which is the component that is visible in FIGS. 1 and 2. As previously indicated, each knob 136 is generally triangular.

Each push button knob 136 is mounted on the front end of a corresponding push button shaft 138. The knob 136 and the shaft 138 are movable rearwardly and forwardly relative to the casing 112 of the switch device 110. The knob 136 and the shaft 138 ar preferably molded from a suitable resinous plastic material. It will be seen that the knob 136 has a rearwardly projecting sleeve or shank portion 140 with an opening 142 therein for receiving a front end portion 144 of the push button shaft 138. The detailed construction of the push button knob 136 is shown in FIGS. 19-22. Details of the push button shaft 138 are shown in FIGS. 15-18. It will be seen from FIGS. 15 and 16 that the front end portion 144 of the push button shaft 138 is formed with a plurality of barbs 146 for securely retaining the front end portion 144 in the opening 142, when the push button knob 136 and the push button shaft 138 are assembled. Such assembly is accomplished by inserting the front end portion 144 of the shaft 138 into the opening 142, following which the knob 136 and the shaft 138 are pushed together.

Figure 7:
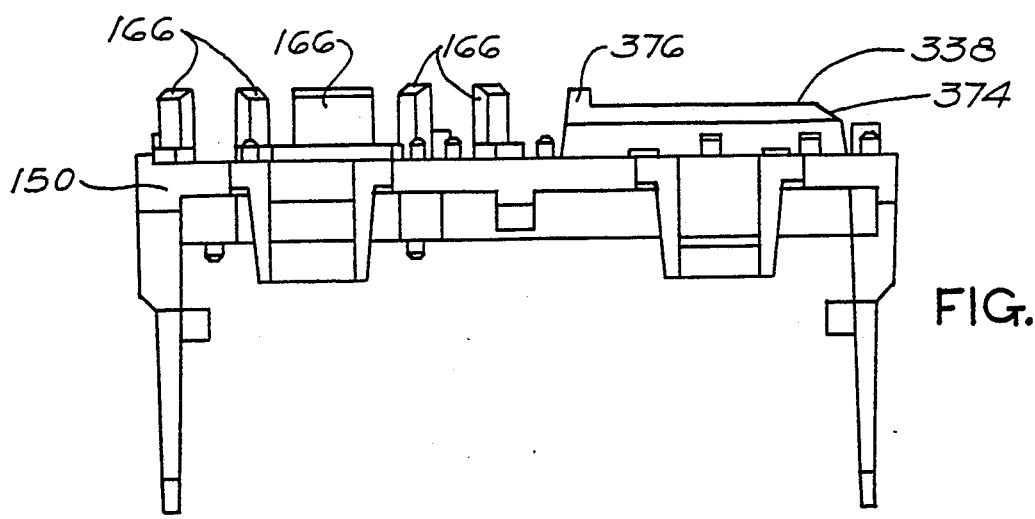
FIG. 7 is an enlarged bottom view of the body shown in FIG. 6.
Figure 8:
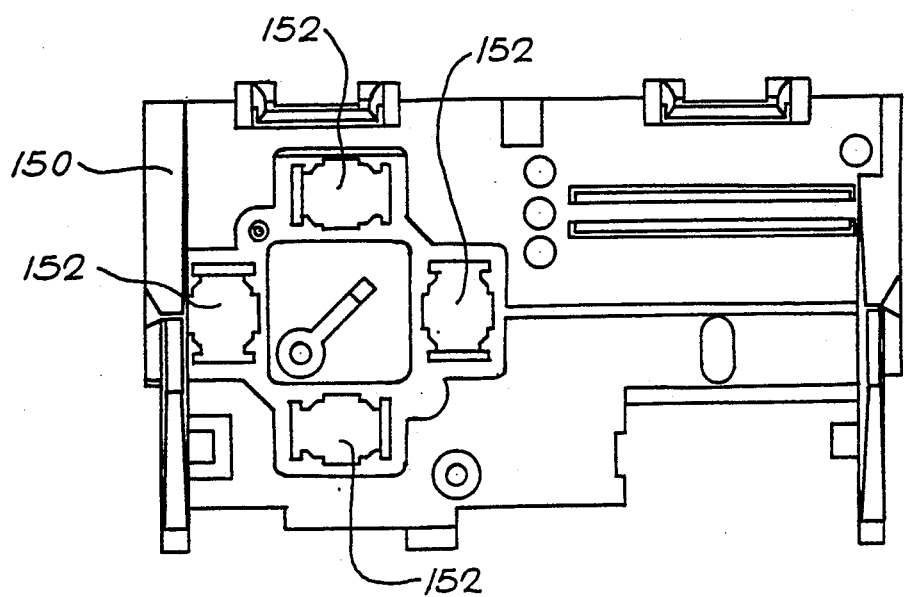
FIG. 8 is an enlarged inverted rear view of the body shown in FIGS. 6 and 7.

Referring again to FIGS. 9 and 10, in conjunction with FIGS. 6-8, the mirror control switch device 110 is provided with an internal mounting plate or body 150 affording guide means for the push button shafts 138 of all four push button switches 134. Only a fragment of the mounting plate 150 is shown in FIGS. 9 and 10. The entire plate 150 is shown in FIGS. 6-8. The plate 150 is an internal component of the casing 112 and is secured thereto. Like the other components of the casing 112, the plate 150 is preferably molded from a suitable resinous plastic material, affording mechanical strength and electrical insulation. As shown in FIGS. 6 and 8, the stationary plate 150 is formed with a cluster of four openings 152 in which the push button shafts 138 are slidably guided for movement rearwardly and forwardly along the longitudinal dimension of the shafts. It will be seen from FIGS. 15-17 that each of the push button shafts 138 has a rear end portion 154 which is substantially square or rectangular in cross section. An enlarged noncircular generally rectangular portion 155 is formed on each of the shafts 138 at the front end of the square portion 154. Each of the guide openings 152 is noncircular in cross section and is adapted to receive and orient the enlarged noncircular portion 155 of the corresponding push button shaft 138. The bezel 114 at the front of the casing 112 has a rear wall 156 that is formed with a cluster of four substantially circular guide openings 158 in which the cylindrical rear portions 140 of the push button knobs 136 are slidably guided.

Each of the push button shafts 138 is resiliently biased in a forward direction by spring means, illustrated in FIG. 9 as a compression coil spring 160, received around a generally cylindrical intermediate portion 162 of the push button shaft 138. Some other resilient means could be provided. The front end of the coil spring 160 engages a flange 164 projecting outwardly from the push button shaft 138 at the junction between the front end portion 144 and the intermediate portion 162 of the push button shaft 138. The flange 164 is adapted to engage the rear wall 156 of the bezel 114 so as to limit the forward movement of the push button shaft 138 under the biasing impetus of the corresponding coil spring 160.

As shown in FIG. 9, the rear ends of all four coil springs 160 are adapted to engage the stationary plate 150. The rear portion of each coil spring 160 is received around and located by a pair of arcuate projections 166, extending forwardly on the plate 150 on opposite sides of the corresponding guide opening 152. Four pairs of the arcuate projections 166 are provided on the plate 150 for locating the four coil springs 160 which bias the four push button shafts 138 forwardly.

As shown in FIGS. 9 and 10, each push button shaft acts as a carriage for an electrically conductive contactor 170 which is illustrated separately in FIGS. 11-14. There are four of the contactors 170, mounted on the rear portions 154 of the four push button shafts 138. As illustrated, each contactor 170 takes the form of a generally U-shaped leaf spring, made of thin resilient sheet metal and having first and second flexible resilient spring arms 172 and 174, projecting forwardly and flaring laterally from a transverse rear portion 176. Each contactor 170 also has a pair of spaced parallel mounting flanges 178 extending forwardly from the rear portion 176. The mounting flanges 178 extend in directions which are transverse to the directions of the flexible spring arms 172 and 174, which flare outwardly away from each other, as shown in FIGS. 9 and 11. The mounting flanges 178 have diametrically opposite openings 180 therein for receiving a rivet 182 or other suitable fastener, adapted to extend through a corresponding opening 184 in the rear portion 154 of the corresponding push button shaft 138. The front end portions of the contactor arms 172 and 174 are formed into arcuate riders 186 and 188. The spring contactor arms 172 and 174 are preferably bifurcated, as shown in FIGS. 12 and 14, by the formation of longitudinal slots 190 and 192 therein.

In FIG. 9, the push button 116 is shown in full lines in its depressed position into which it may be pushed by the driver. When the push button 116 is released by the driver, it is returned to its extended position by the spring 160. The extended position of the corresponding push button knob 136 is shown in broken lines in FIG. 9. Similarly, the rearwardly displaced position of the contactor 170 is shown in full lines in FIG. 9. Broken lines are employed to show the forwardly returned positions of the riders 186 and 188 and fragmentary portions of the contactor arms 172 and 174. Thus, the range of rearward and forward movement of the contactor riders 186 and 188 is clearly evident in FIG. 9.

When the push button 116 is in its initial, forwardly returned position, the rider 186 on the first contactor arm 172 engages a first fixed contact 196 which is positioned within the guide opening 152 in the mounting plate 150. When the push button 116 is moved to its rearwardly displaced position, the rider 186 on the contactor arm 172 is moved into engagement with a second fixed contact 194 which is also located in the opening 152 formed in the mounting plate 150.

Throughout the range of movement of the second contactor arm 174, the rider 188 thereon is slidably engaged with an additional fixed contact 198, positioned within the opening 152 in the mounting plate 150, diametrically opposite from the first and second fixed contacts 194 and 196. The fixed contacts 194, 196 and 198 are made of a suitable conductive metal.

The fixed contacts 194 and 196 are mounted on and supported by the mounting plate 150 which is made of an electrically insulating material, as previously indicated. The mounting plate 150 is formed with an electrically insulating member, preferably in the form of a boss or projection 200, which extends between the fixed contacts 194 and 196. The insulating boss 200 is positioned and dimensioned so that the rider 186 of the contactor arm is slidably engageable with the insulating boss 200 as rider 186 travels between the first and second fixed contacts 194 and 196. Thus, the insulating boss 200 provides a break-before-make switching action whereby the rider 186 breaks contact with the fixed contact element 194 before the rider 186 makes contact with the fixed contact element 196, when the rider 186 is moved between the fixed contact elements 194 and 196. Similarly, the rider 186 breaks contact with the contact element 196 before making contact with the contact element 194, when the rider 186 is moved between the contact elements 196 and 194. The insulating boss 200 is sufficiently wide and projects sufficiently into the path of the rider 186 to prevent the rider 186 from bridging between the fixed contact elements 194 and 196. It also can be said that the fixed contact elements 194 and 196 are spaced apart sufficiently to prevent any bridging therebetween by the rider 186 as it travels in either direction between the fixed contact elements 194 and 196.

It may be helpful at this juncture to refer to FIG. 29 which is a schematic wiring diagram of the mirror control switch device 110. The four push button switches 134 are illustrated schematically as single pole double throw switches. The four movable contactors 170 are individually identified as 170L, 170R, 170U, and 170D. The fixed contacts 194 and 196 are also shown schematically in FIG. 29. All four of the first fixed contacts 194 are connected to a first conductor 202, while all four of the second fixed contacts 196 are connected to a second conductor 204. The conductors 202 and 204 are connected to first and second battery or power supply terminals 206 and 208, identified as B+ and GND. Thus, the terminal 206 is adapted to be connected to the positive battery terminal, while the terminal 208 is adapted to be connected to the grounded negative battery terminal. It will be understood that the conductive frame of the vehicle may serve as a ground conductor to which the terminal 208 and the negative battery terminal are connected.

As shown, a lamp 210 is connected between the grounded battery terminal 208 and a terminal 211 adapted to be connected to the positive battery supply terminal to which the instrument panel lamps are connected. Thus, the terminal 211 is marked IPB+. The lamp 210 is lighted along with the instrument panel lamps, when the headlamp switch of the vehicle is turned ON. The lamp 210 is mounted within the casing 112 and is employed to illuminate the display 128.

The conductors 202 and 204 take the form of conductive sheet metal strips or elements, fragments of which are shown in FIG. 9. The first and second fixed contacts 194 and 196, also shown in FIG. 9, are preferably in the form of tabs or flanges, bent from or otherwise formed in one piece with the sheet metal conductor elements 202 and 204.

Figures 26A, 30:
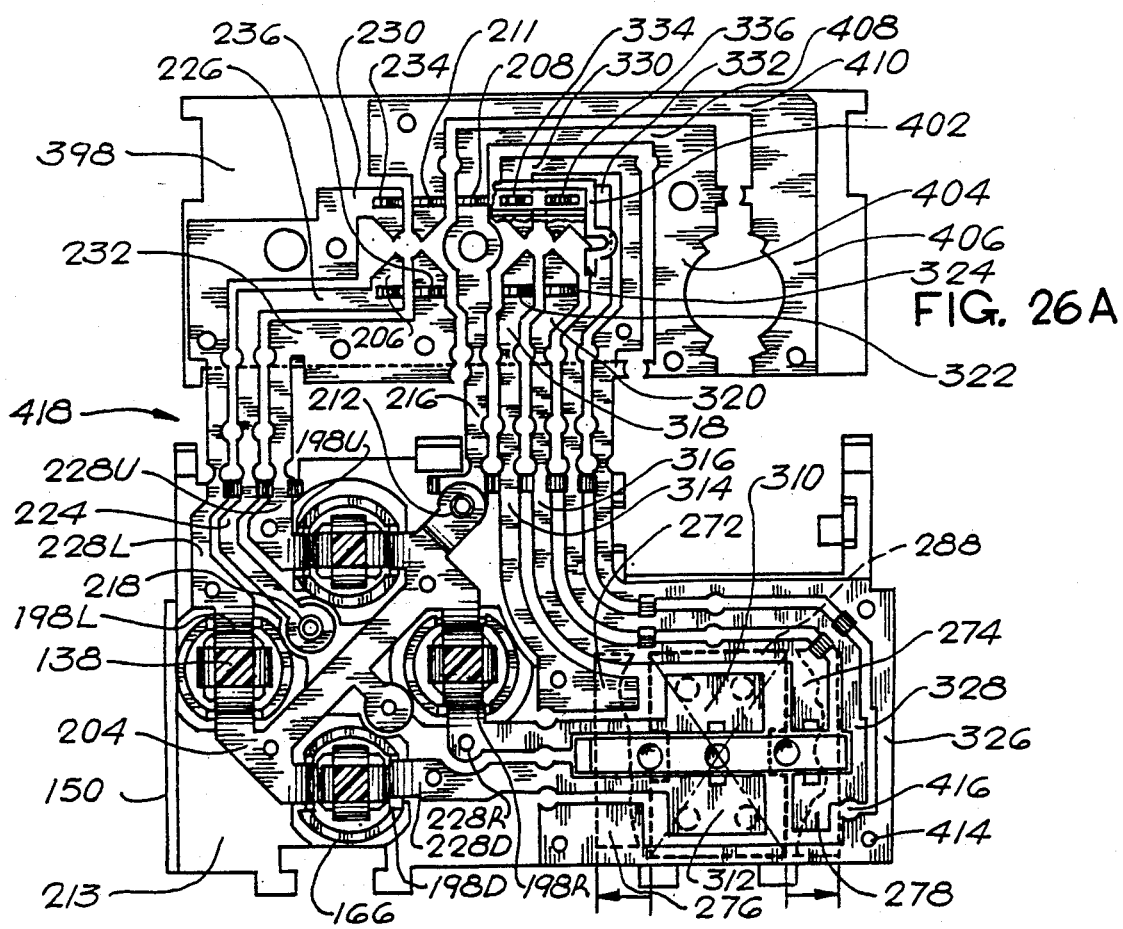
FIG. 26A is a view similar to FIG. 26, but showing the conductor elements in a more advanced stage of assembly with the associated receptacle terminals and the plastic supporting structure.
FIG. 30 is a truth table showing the operating modes of the mirror motors for various combinations of simultaneous operations of the four push button switches.

For reasons of economy, the sheet metal conductor elements 202 and 204 may be the same in construction and may be formed as shown in FIGS. 23-25. The first and second conductor elements 202 and 204 are mounted on opposite sides of the electrically insulating plate or body 150 and may be secured to the plate 150 by rivets or other suitable fasteners. In FIGS. 26 and 26A, the second sheet metal conductor element 204 is shown in its assembled position on a generally flat front side 213 of the insulating plate 150 and secured thereto by a rivet 212. As shown in FIG. 23, the conductor element 204 is provided with an opening 214, formed in an end portion thereof and adapted to receive the rivet 212. Returning to FIGS. 26 and 26A, the rivet 212 is employed to clamp the conductor element 204 against another conductor element 216 which extends to the power input terminal 208 whereby the switch device 110 is connected to the grounded terminal of the battery, as previously described in connection with FIG. 29, in which the terminal 208 and the conductor elements 204 and 216 are shown diagrammatically.

The other sheet metal conductor element 202 is mounted on the rear side of the insulating plate or body 150 and is not shown in FIGS. 26 and 26A. However, a second rivet 218 is shown whereby the conductor element 202 is secured to the rear side of the insulating plate 150. The rivet 218 is adapted to extend through an opening 220 formed in an intermediate portion 222 of the conductor element 202, as shown in FIG. 23. On the front side 213 of the insulating plate 150, as shown in FIGS. 26 and 26A, the rivet 218 is connected to an end portion of another sheet metal conductor element 224 having a remote portion 226 connected to the terminal 206, which is shown diagrammatically in FIG. 29 as the positive power supply terminal. In FIG. 26A, the terminal 206 is shown as another receptacle or connector terminal, constituting one of the terminals of the receptacle 132 of FIG. 5.

All four of the additional fixed contacts 198 are shown in FIGS. 26 and 26A. To distinguish the four fixed contacts 198, they are designated 198L, 198R, 198U, and 198D. These reference characters also appear in the schematic circuit diagram of FIG. 29. It will be seen from FIGS. 26 and 26A that the additional fixed contacts 198L, 198R, 198U, and 198D are formed as flanges or tabs on sheet metal conductor strips or elements 228L, 228R, 228U, and 228D which are mounted on the front side 213 of the insulating plate or body 150. As shown in FIGS. 26 and 26A, the conductor elements 228L and 228U have remote portions 230 and 232 adapted to be connected to terminals 234 and 236, as shown in FIG. 26A. The terminals 234 and 236 are components of the electrical receptacle 132, shown in FIG. 5. FIG. 29 includes diagrammatic representations of the conductor elements 228L and 228U, the remote portions 230 and 232, and the terminals 234 and 236.

FIG. 29 also includes diagrammatic representations of the previously mentioned left and right rearview mirrors 238 and 240, which are simply indicated as broken line boxes in FIG. 29. The left mirror 238 is provided with a right-left motor 242 and an up-down motor 244, for adjusting the left mirror in the corresponding directions. Similarly, the right mirror 240 has a right-left motor 246 and an up-down motor 248. In accordance with the circuit diagram of FIG. 29, one terminal 250 of the right-left motor 242 and one terminal 252 of the right-left motor 246 are connected to a common conductor or lead 254 which is connected to the terminal 234 to which the push button switch contactor 170L is connected, as previously described. Similarly, one terminal 256 of the up-down motor 244 and one terminal 258 of the up-down motor 248 are connected to another common conductor or lead 260 which is connected to the terminal 236, to which the push button switch contactor 170U is connected, as previously described.

As previously indicated, the mirror control switch device 110 includes a selector switch 262, shown diagrammatically in FIG. 29, whereby the push button switches 134 may be switched to either the motors 242 and 244 for the left mirror 238 or the motors 246 and 248 for the right mirror 240. The selector switch 262 is effectively a double pole double throw switch having a central OFF position as well as LEFT and RIGHT switching positions, as previously indicated in connection with FIG. 2.

As shown diagrammatically in FIG. 29, the selector switch 262 is provided with a pair of movable contactors 264 and 266 which are connected to the push button contactors 170R and 170D. The selector switch 262 has first and second portions 268 and 270. The first portion 268 includes the movable contactor 264 as well as left and right fixed contacts 272 and 274 which are alternately engageable by the movable contactor 264. Similarly, the second switch portion 270 comprises left and right fixed contacts 276 and 278 with which the movable contactor 266 is alternately engageable.

The right-left motor 242 for the left mirror 238 has a second terminal 280, in addition to the first terminal 250. The second terminal 280 is connected to the fixed contact 272. Similarly, the right-left motor 246 for the right mirror 240 has a second terminal 282, in addition to the first terminal 252. The second terminal 282 is connected to the fixed contact 274.

The up-down motor 244 for the left mirror 238 has a second terminal 284, in addition to the first terminal 256. The second terminal 284 is connected to the fixed contact 276. Similarly, the up-down motor 248 for the right mirror 240 has a second terminal 286, in addition to the first terminal 258. The second terminal 286 is connected to the fixed contact 278.

Figure 28:
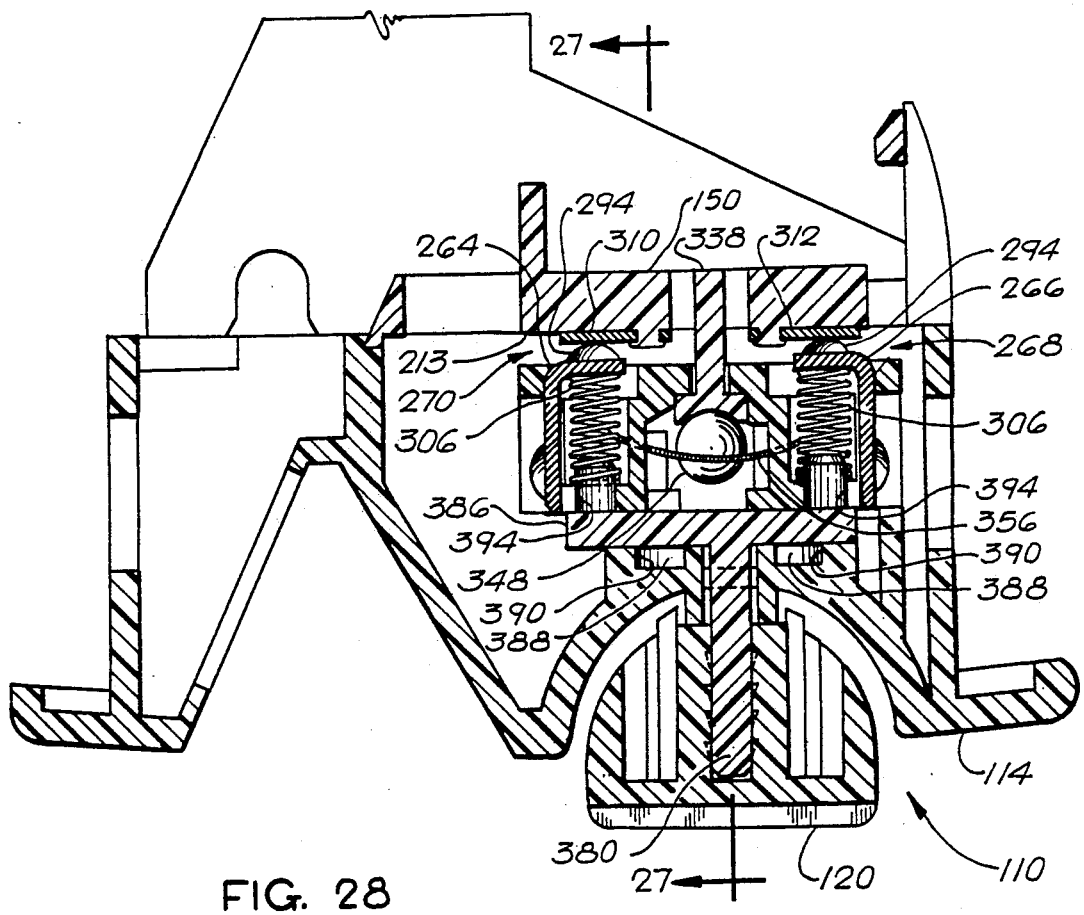
FIG. 28 is an enlarged vertical section taken through the left-right selector switch device, generally along the line 28—28 shown in FIGS. 2 and 27.

The movable contactors 264 and 266 are shown in cross section in the vertical section represented by FIG. 28. The contactors 264 and 266 are formed from a suitable conductive sheet metal. It will be seen that the contactors 264 and 266 are mounted on upper and lower portions of a carriage 288 which is preferably molded from an electrically insulating material such as a suitable resinous plastic material. The carriage 288 is slidable in a horizontal direction and is operable by the knob 120 as previously described in connection with FIG. 4.

The contactors 264 and 266 are preferably identical in construction. As shown in FIGS. 35-37, each of the contactors 264 and 266 is bent or otherwise formed from sheet metal and is generally L-shaped in cross section. Thus, each of the contactors 264 and 266 has first and second flanges 290 and 292. The flange 290 is preferably formed with a pair of spaced contactor points or riders 294 which are engageable with the fixed contacts, as will be described in greater detail presently. The flange 292 is employed for mounting each of the contactors 264 and 266 on the carriage 288 and preferably is formed with a detent point 296. The contactor points 294 and the detent point 296 are preferably spherically curved.

Details of the carriage 288 will be evident from FIGS. 42-46 which show the carriage separately. It will be seen that the carriage 288 is formed with a pair of slots 298 for slidably receiving the flanges 292 of the contactors 264 and 266. The slots 298 are horizontally oriented in the normal position of the carriage 288. The slidable reception of the flanges 292 in the slots 298 provides for movement of the contactors 264 and 266 in a rearward direction into engagement with the associated fixed contacts 272, 274, 276 and 278, as will be described in greater detail presently.

Each of the flanges 292 is preferably detained in the corresponding slot 298 by the action of the detent point 296, which is adapted to snap past a flexible resilient bar 300 at the entrance to the corresponding slot 298. The detent point 296 is then loosely slidable in a slot 302 formed in the corresponding end wall 304 of the carriage 288.

As shown in FIG. 28, each of the contactors 264 and 266 is biased rearwardly relative to the carriage 288 by its own biasing means, preferably in the form of the illustrated compression coil spring 306, compressed between the carriage 288 and the first flange 290 of the contactor. As shown in FIG. 44, the carriage 288 is formed with a pair of generally circular spring nests or seats 308 for receiving and locating the coil springs 306.

As shown in FIGS. 26 and 26A, the fixed contacts 272, 274, 276 and 278 preferably take the form of sheet metal contact elements or plates, secured to the generally flat front side 213 of the electrically insulating body or plate 150. The fixed contacts 272 and 274 are spaced apart longitudinally by a considerable distance, and an additional or intermediate fixed contact 310 is mounted in a portion of the space between the contacts 272 and 274. One or both of the contactor points 294 on the first contactor 264 are engageable with the fixed contact 310 throughout the range of movement of the contactor 264 and its supporting carriage 288. The fixed contact 310 is preferably in the form of a sheet metal element or plate, secured to the front side 213 of the insulating body or plate 150. As shown in FIGS. 26 and 26A, the sheet metal conductor strip or element 228R is connected to the fixed contact 310 and is actually formed in one piece therewith. Thus, the fixed contact 310 is connected to the fixed contact 198R which engages the push button contactor 170R. All of this is also shown diagrammatically in FIG. 29.

Similarly, FIGS. 26 and 26A show that the fixed contacts 276 and 278 are spaced apart a considerable distance, and that a fixed contact 312 is mounted on the front side 213 of the insulating plate 150 so as to occupy a portion of the space between the fixed contacts 276 and 278. As illustrated, the fixed contact 312 is preferably in the form of a sheet metal element or plate, secured to the front side 213 of the insulating body or plate 150. The sheet metal conductor element o strip 228D is connected to the fixed contact 312 and is actually formed in one piece therewith. Thus, the fixed contact 312 is connected to the fixed contact 198D which engages the push button switch contactor 170D, as also shown diagrammatically in FIG. 29. One or both of the contactor points 294 on the contactor 266 engage the fixed contact 312 throughout the range of horizontal sliding movement of the contactor 266 and its supporting carriage 288. Thus, the push button contactor 170D is connected electrically at all times to the selector switch contactor 266. Similarly, the push button contactor 170R is connected electrically at all times to the selector switch contactor 264.

As shown in FIG. 26A, the fixed contacts 272 and 274 are connected to respective conductor elements or strips 314 and 316 having respective remote portions 318 and 320 to which respective terminals 322 and 324 are connected. The terminals 322 and 324 are components of the electrical receptacle 132 of FIG. 5.

Similarly, the fixed contacts 276 and 278 are connected to respective conductor elements or strips 326 and 328 having respective remote portions 330 and 332 to which respective terminals 334 and 336 are connected. The terminals 334 and 336 are components of the electrical receptacle 132 of FIG. 5.

Figure 27:
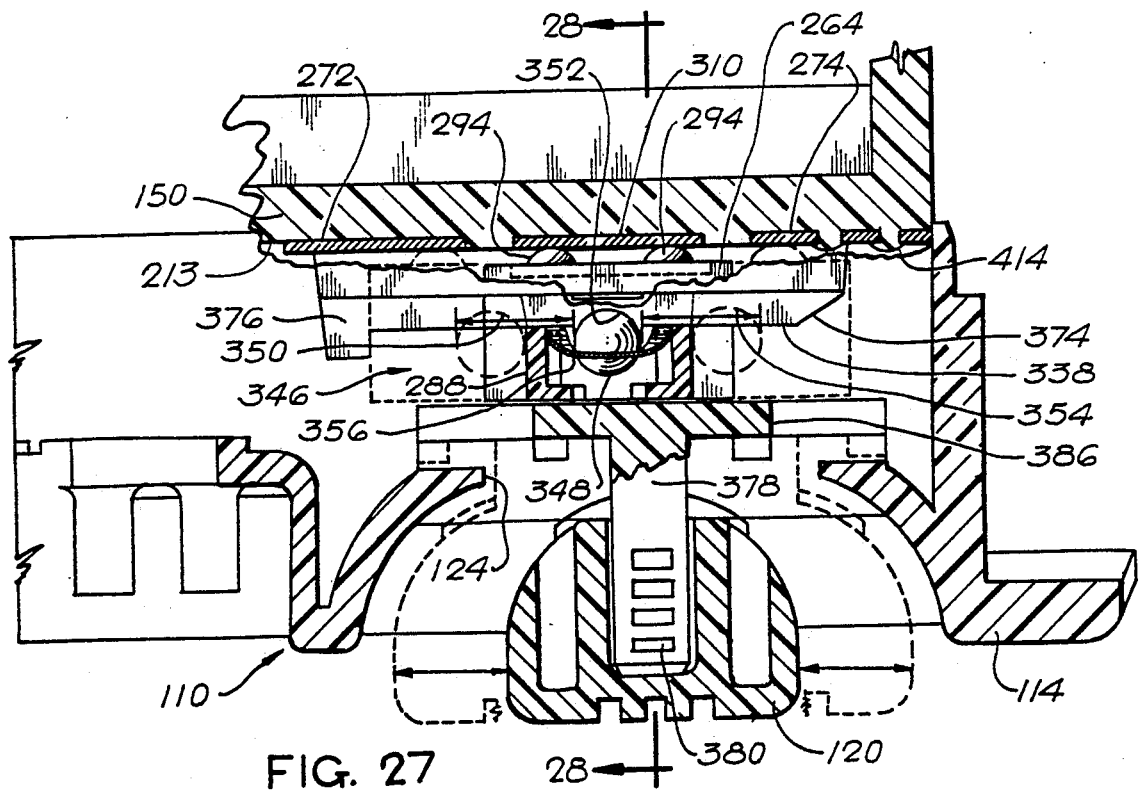
FIG. 27 is an enlarged horizontal section taken through a left-right selector switch device incorporated into the mirror control switch of FIGS. 1-5, the view being taken generally along the broken line 27—27 shown in FIGS. 2 and 28.

The selector switch 262 of FIGS. 27 and 28 is provided with guide means for guiding the carriage 288 so that it will be slidably movable in a horizontal direction or longitudinally relative to the insulating body or plate 150. Such guide means preferably comprise interengaging guide elements on the supporting plate 150 and the carriage 288. As illustrated in FIG. 28, the guide element on the supporting plate 150 is in the form of an elongated horizontal or longitudinal guide flange or rib 338, projecting forwardly on the supporting plate 150 and preferably molded in one piece therewith. As illustrated, the guide flange 338 is preferably T-shaped in cross section and is substantially perpendicular to the front side 213 of the plate 150. The guide elements on the carriage 288 comprise a pair of formations 340 on the rear side thereof, forming a pair of slots or openings 342 for slidably receiving and interlocking with the T-shaped guide flange 338. The slots 342 are shown to best advantage in FIGS. 43, 44 and 46, which show the carriage 288 separately. The illustrated slots 342 are T-shaped in cross section and are formed in diametrically opposite side walls 344 on the carriage 288. The T-shaped flange 338 is received with a sliding fit in the T-shaped slots 342.

The selector switch 262 is provided with detent means 346 for detaining the carriage 288 in a plurality of positions along its horizontal or longitudinal path of movement relative to the supporting body or plate 150. Such detent means involve interengageable elements on the carriage 288 and the guide flange 338. Specifically, the carriage 288 is provided with a detent ball 348 which is adapted to be received in a series of three recesses 350, 352 and 354 for detaining the carriage 288 in its LEFT position, its OFF position, and its RIGHT position, respectively.

The detent ball 348 is biased or urged into engagement with the guide flange 338 by resilient means, illustrated in FIGS. 40 and 41 as a leaf spring 356. Some other type of spring or resilient means could be used, as desired.

The leaf spring 356, which is shown separately in FIGS. 38 and 39, is made of thin resilient sheet metal, such as spring steel, for example. The leaf spring 356 comprises a generally rectangular central portion 358 having two pairs of spring arms 360 extending in opposite directions from the four corners of the central portion 358. A circular opening 362 is formed centrally in the central portion 358 of the leaf spring 356 and is somewhat smaller in diameter than the detent ball 348, so that the opening 362 is adapted to provide a seat for the detent ball, as shown in FIGS. 27, 28, 40 and 41.

When the leaf spring 356 is in its initial unstressed condition, the spring is substantially flat. The leaf spring 356 is adapted to be installed in a cavity 364 formed in the carriage 288. Within the cavity 364, the carriage 288 is formed with four ledges 366 adapted to support the four arms 360 of the leaf spring 356. When the carriage 288 is slidably mounted on the T-shaped guide flange 338, the leaf spring 356 is flexed so as to bias or urge the detent ball 348 against the front surface of the flange 338. When the detent ball 348 is aligned with any of the three detent recesses 350, 352 and 354, the leaf spring 356 presses the detent ball 348 into the corresponding recess, as shown in FIG. 40 and also in FIGS. 27 and 28. When the detent ball 348 is being moved between the detent recesses 350, 352 and 354, the leaf spring 356 presses the detent ball 348 against the front surface of the T-shaped guide flange 338, as shown in FIG. 41.

In the cavity 364 and adjacent to the four ledges 366, the carriage 288 is provided with four ramps 368 which slope forwardly from the four ledges toward a front wall portion 370 of the carriage 288. The ramps 368 provide additional support for the flexible arms 360 of the leaf spring 356, when the spring is flexed to a considerable extent, as in the assembly of the carriage 288 on the T-shaped guide flange 338. The ramps 368 ensure that the ends of the flexible spring arms 360 will be guided into engagement with the ledges 366 when the maximum flexure of the leaf spring 356 is released, and also when the leaf spring 356 is being assembled into the cavity 364 in the carriage 288.

As shown in FIGS. 44 and 46, the carriage 288 is formed with a generally L-shaped flange or finger 372 for engaging the detent ball 348 and lightly holding it in the circular opening 362 in the leaf spring 356, immediately after the leaf spring 356 and the detent ball 348 have been assembled into the cavity 364 in the carriage 288. By holding the detent ball 348 in its proper position, the flange 372 greatly facilitates the assembly of the carriage 288 on the T-shaped flange 338.

During the assembly of the mirror control switch device 110, the carriage 288 is assembled on the T-shaped guide flange 338 by moving the carriage into engagement with the right hand end of the guide flange 338, as seen in FIG. 27. To facilitate such assembly, the right hand end of the guide flange 338 is formed with a sloping ramp 374 as shown in FIG. 27 and also in FIG. 7. The left hand end of the guide flange 338 is formed with a forwardly projecting stop or lug 376 for engagement by the carriage 288 to locate the carriage 288 in its LEFT position and to prevent any inadvertent movement of the carriage 288, off the left hand end of the flange 338, during the assembly of the switch device 110. When the body member or plate is assembled into the casing 112, the carriage 288 is retained on the T-shaped guide flange 338 by the casing wall, adjacent the right hand end of the flange 338.

As previously indicated, the selector switch 262 is adapted to be operated by the operating knob 120 which is movable horizontally along the recess 122 in the bezel 114. As shown in FIGS. 27 and 28, the knob 120 is connected to a shaft 378 which is slidable along the horizontal slot 124 in the wall 126 of the bezel 114. It will be seen that the shaft 378 is generally rectangular in cross section. The shaft 378 has a front portion 380 which is adapted to be received in a socket or opening 382, formed in the rear portion of the operating knob 120. The socket 382 is generally rectangular in cross section. As illustrated in FIGS. 28 and 48, the front portion 380 of the shaft 378 is formed with a plurality of barbs 384 for securely retaining the knob 120 on the front portion 380 of the shaft 378.

A slider or plate 386 is connected to the rear end of the shaft 378 and preferably is molded in one piece therewith. The shaft 378, with the slider 386 thereon, is shown separately in FIGS. 47-50. As shown in FIG. 49, the front side of the slider 386 is formed with two pairs of guide bosses or tabs 388 which are slidably received in a pair of horizontal guide grooves or channels 390, formed in the rear side of the bezel 114, as shown in FIG. 28.

The slider 386 is provided with means adapted to be assembled into an operating relationship with the carriage 288 of the selector switch 262, such means being illustrated in FIGS. 47 and 48 as comprising a pair of rearwardly projecting pins 392 on the slider 386. The pins 392 are adapted to mate with openings 394 formed in a front wall portion 396 of the carriage 288, as shown separately in FIG. 42. As shown in FIG. 28, the openings 394 are aligned with the compression coil springs 306 which are employed to bias the contactors 264 and 266 rearwardly. The mating connection between the pins 392 and the carriage 288 makes it easy to assemble the switch device 110.

When the operating knob 120 (FIGS. 2 and 27) of the selector switch 262 is moved to its LEFT position, the first contactor 264 (FIG. 28) on the upper end of the carriage 288 forms a conductive bridge between the fixed contacts 272 and 310 (FIG. 26A). The second contactor 266, on the lower end portion of the carriage 288, forms a conductive bridge between the fixed contacts 276 and 312. As a result, the motors 242 and 244 of the left mirror 238 (FIG. 29) are connected to all four of the push button switches 134, so that the driver of the automobile or other vehicle can adjust the left mirror up or down, and left or right. The motors 246 and 248 of the right mirror 240 are inactive because they can not be energized.

When the operating knob 120 of the selector switch 262 is moved to its central OFF position, both contactor points 294 of the first contactor 264 are in engagement with the fixed contact 310. Similarly, both contactor points 294 of the second contactor 266 are in engagement with the fixed contact 312. As a result, all of the motors 242, 244, 246 and 248 of both the left and right mirrors 238 and 240, respectively, are inactive. In this position of the operating knob 120, the left and right mirrors 238 and 240 can not be adjusted by the driver. In FIG. 26A, the outline of the carriage 288 is shown in phantom, with broken lines.

When the operating knob 120 of the selector switch 262 is moved to its RIGHT position, the first contactor 264 forms a conductive bridge between the fixed contacts 274 and 310. The second contactor 266, forms a conductive bridge between the fixed contacts 278 and 312. As a result, the motors 246 and 248 of the right mirror 240 are connected to all four of the push button switches 134, so that the right mirror 240 can be adjusted up or down and right or left. The motors 242 and 244 of the left mirror 238 are rendered inactive.

As previously indicated, the mirror control switch device 110 is provided with four of the push button switches 134 (FIG. 29), operable by the four push buttons 116U, 116D, 116L and 116R (FIGS. 1 and 2). FIG. 30 is a truth table, illustrating the results produced by operating multiple push button switches, in combinations of two, three, and four of the push button switches 134. In addition, the first line of the table covers the initial state, when no push button switch is actuated. In the truth table, the letter X in any column indicates that the corresponding push button switch 134 is actuated. In addition to the first line, indicating the initial unactuated state of the push button switches, the truth table has eleven lines, illustrating the results produced by actuating eleven different combinations of the push button switches. The table shows that no untoward result is produced by operating any combination of the push button switches. The worst case resides in the fact that the operation of certain combinations of the push button switches does not cause any of the mirror motors to run. The truth table also shows that both the UP-DOWN motor and the RIGHT-LEFT motor can be operated simultaneously, by actuating certain combinations of the push button switches. Of course, the four push buttons 116U, 116D, 116L and 116R can be operated individually, to produce operation of the corresponding individual motors in the desired direction.

FIGS. 26 and 26A are similar in that the lower portion of each view shows the electrically insulating body or plate 150 and the various components mounted thereon. The upper portion of each view shows conductor portions and elements mounted on an electrically insulating terminal head 398, preferably molded from a suitable resinous plastic material. Thus, the conductor portions 226, 230, 232, 318, 320, 330 and 332 are suitably mounted on the terminal head 398.

FIG. 26A differs from FIG. 26 in that nine terminals 206, 208, 211, 234, 236, 322, 324, 334 and 336 have been added to the assembly on the terminal head 398. The nine terminals are mounted on the respective conductor portions 226, 216, 410, 230, 232, 318, 320, 330 and 332, as described herein. All of the nine terminals may be in the form of terminal prongs, staked into slots 400, formed in the various terminal portions, as shown in FIG. 26. As previously indicated, the nine terminals are components of the electrical receptacle 132, shown in FIG. 5. The receptacle 132 has an outwardly projecting housing 402, molded or otherwise made of an electrically insulating resinous plastic material. The housing 402 is shown in FIGS. 1–3 and 5. FIG. 26A includes a fragmentary showing of the housing 402.

As shown in FIGS. 26 and 26A, lamp contacts 404 and 406 are suitably mounted on the insulating terminal head 398. A conductor strip 408, formed in one piece with the lamp contact 404, extends between the lamp contact and the conductor strip 216 on which the grounded power supply terminal 208 is mounted. The other lamp contact 406 is formed in one piece with a conductor strip 410 on which the terminal 211 is mounted. As previously indicated in connection with FIG. 29, the terminal 211 is adapted to be connected to the positive battery supply terminal to which the instrument panel lamps are connected, so that the lamp 210 is lighted whenever the instrument panel lamps are turned ON, by operation of the headlamp switch.

The lamp contacts 404 and 406 are adapted to receive a lamp holder 412 on which a lamp, not shown, is mounted. The lamp holder 412 is shown in FIG. 5. The lamp may be of a standard miniature type, widely used in automotive applications.

All of the fixed contacts and conductor elements shown in FIGS. 26 and 26A, with the exception of the conductor element 204, may be stamped or otherwise formed in one piece from a suitable conductive sheet metal, such as brass, which is silver plated after being stamped. The stamping is mounted on the plastic body or plate 150 and the plastic terminal head 398 and is suitably secured thereto, as by means of numerous plastic pins 414, which are formed with heads by the application of cold pressure or ultrasonic energy. The pins 414 are shown in FIGS. 26, 26A and 27. The sheet metal stamping includes numerous metal webs for temporarily connecting the separate conductor elements together. After the metal stamping has been mounted on the plastic members 150 and 398, the Webs are severed or cut away, leaving numerous severing artifacts 416, as shown in FIGS. 26 and 26A.

During the assembly of the electrical components, as shown in FIGS. 26 and 26A, the contacts and the conductor elements are all in one plane, due to the fact that the contacts and conductor elements are initially formed as a single sheet metal stamping. After the assembly has been completed, as shown in FIG. 26A, the various conductor elements which extend between the plastic plate 150 and the plastic terminal head 398 are folded along a line indicated by an arrow 418 in FIG. 26A, so that the housing 402 of the electrical receptacle 132 is displaced to a rearwardly sloping position, as shown in FIGS. 1 and 3.

Various modifications, alternative constructions and equivalents may be employed without departing from the true spirit and scope of the present invention as described in the preceding specification and defined in the following claims.

I claim:

1. An electrical selector switch, comprising
a casing,
an electrically insulating plate in said casing,
said plate having one side formed with an elongated guide flange projecting therefrom and extending in a longitudinal dimension along said side,
said side being generally flat,
said flange being generally T-shaped in cross section and being substantially perpendicular to said side of said plate;
first and second sets of electrically conductive fixed contacts mounted along said generally flat side of said plate on opposite sides of said flange,
an electrically insulating carriage having a longitudinal channel therein receiving and interlocking with said flange and having a cross section corresponding with the generally T-shaped cross section of said flange,
first and second electrically conductive contactors mounted on said carriage and slidably engageable with said first and second sets of fixed contacts,
and first and second spring means for biasing said first and second contactors toward and against said first and second sets of fixed contacts while biasing said carriage away from said plate, said carriage being slidable along said flange while said contactors are selectively engageable with said first and second sets of fixed contacts.

2. An electrical selector switch, comprising a casing, an electrically insulating plate in said casing, said plate having one side formed with an elongated guide flange projecting therefrom and extending in a longitudinal dimension along said side, said side being generally flat, said flange being generally T-shaped in cross section and being substantially perpendicular to said side of said plate, first and second sets of electrically conductive fixed contacts mounted along said generally flat side of said plate on opposite sides of said flange, an electrically insulating carriage having a longitudinal channel therein slidably receiving and interlocking with said flange and having a cross section corresponding with the generally T-shaped cross section of said flange, first and second electrically conductive contactors mounted on said carriage and slidably engageable with said first and second sets of fixed contacts, and first and second spring means for biasing said first and second contactors toward and against said first and second sets of fixed contacts while biasing said carriage away from said plate, said carriage being slidable along said flange while said contactors are selectively engageable with said first and second sets of fixed contacts, said switch including a detent ball disposed between said carriage and said flange, said carriage having a seat therein for receiving and locating said ball, and additional spring means disposed between said carriage and said ball for biasing said ball against said flange while biasing said carriage away from said flange, said flange being formed with a plurality of detent recesses for receiving said ball in a plurality of detented positions.

3. An electrical selector switch according to claim 2, in which said additional spring means comprises a leaf spring received in said carriage and having a portion forming said seat for receiving and engaging said ball.

4. An electrical selector switch according to claim 2, in which each of said sets of fixed contacts comprises a series of three successively adjacent fixed contacts, each of said contactors being movable into bridging relation between the successively adjacent fixed contacts.

* * * * *